United States Patent
Zhou (12)

(10) Patent No.: US 11,602,021 B2
(45) Date of Patent: Mar. 7, 2023

(54) LINEAR DRIVE CIRCUIT AND LED LIGHT HAVING THE SAME

(71) Applicant: Wuxi ORG Microelectronics co., Ltd, Jiangsu (CN)

(72) Inventor: Zhicheng Zhou, Jiangsu (CN)

(73) Assignee: Wuxi ORG Microelectronics co., Ltd, Wuxi (CN)

( * ) Notice: Subject to any disclaimer, the term of this patent is extended or adjusted under 35 U.S.C. 154(b) by 342 days.

(21) Appl. No.: 17/026,208

(22) Filed: Sep. 19, 2020

(65) Prior Publication Data
US 2022/0039223 A1    Feb. 3, 2022

(30) Foreign Application Priority Data

Jul. 29, 2020    (CN) .......................... 202010746080.0

(51) Int. Cl.
| H05B 45/10 | (2020.01) |
| H05B 45/20 | (2020.01) |
| H05B 45/46 | (2020.01) |
| H05B 45/325 | (2020.01) |

(52) U.S. Cl.
CPC ............. *H05B 45/10* (2020.01); *H05B 45/20* (2020.01); *H05B 45/325* (2020.01); *H05B 45/46* (2020.01)

(58) Field of Classification Search
None
See application file for complete search history.

(56) References Cited

U.S. PATENT DOCUMENTS

| 8,729,811 B2 * | 5/2014 | Melanson | H02M 3/22 315/312 |
| 2004/0090191 A1* | 5/2004 | Mueller | G09G 3/32 315/219 |
| 2012/0153866 A1* | 6/2012 | Liu | H02M 3/33561 363/21.18 |
| 2013/0009557 A1* | 1/2013 | Szczeszynski | H05B 31/50 315/186 |
| 2013/0147375 A1* | 6/2013 | Williams | H05B 45/20 315/192 |
| 2014/0361696 A1* | 12/2014 | Siessegger | H05B 45/395 315/193 |
| 2016/0286612 A1* | 9/2016 | Vos | H05B 45/48 |

FOREIGN PATENT DOCUMENTS

| CN | 105191496 A | 12/2015 |
| CN | 108696967 A | 10/2018 |
| CN | 109076663 A | 12/2018 |

* cited by examiner

*Primary Examiner* — Crystal L Hammond

(57) ABSTRACT

A linear drive circuit and an LED light including the same. The linear drive circuit includes an AC-DC module, an LED module, a CCT and brightness control module, and a drive control module. The AC-DC module is connected to the LED module through a first unidirectional conductive element, and is configured to obtain an AC input voltage control signal, and convert the AC input voltage control signal into a corresponding DC voltage control signal. The CCT and brightness control module is connected to the LED module, and is configured to obtain a corresponding CCT control signal or a brightness control signal according to the DC voltage control signal, so as to adjust the CCT of each LED string in the LED module. The drive control module is configured to receive the brightness control signal, thereby adjusting the brightness of the LED module.

15 Claims, 8 Drawing Sheets

LINEAR DRIVE CIRCUIT AND LED LIGHT HAVING THE SAME

CROSS-REFERENCE TO RELATED APPLICATION

This application claims the benefit of priority from Chinese Patent Application No. 202010746080.0, filed on Jul. 29, 2020. The content of the aforementioned application, including any intervening amendments thereto, is incorporated herein by reference in its entirety.

TECHNICAL FIELD

The present application relates to circuit control, and more particularly to a linear drive circuit and a light-emitting diode (LED) light comprising the same.

BACKGROUND

In recent years, LEDs have been widely used as lighting source, and a new trend is to develop LEDs capable of adjusting both illuminance and correlated color temperature (CCT), as the requirements for LEDs increase and the LED technology develops. However, it is difficult to combine the CCT switching and the illuminance control in a linear drive lighting process.

SUMMARY

In view of this, the present disclosure provides a linear drive circuit for an LED light, in which a DC voltage control signal is obtained by an AC-DC module; a CCT control signal or a brightness control signal is obtained by a CCT and brightness control module; the CCT of each LED string in the LED module is adjusted according to the CCT control signal; finally, the drive control module receives the brightness control signal sent from the CCT and brightness control module, and adjusts the brightness of the LED module according to the brightness control signal, so that the CCT and brightness of the LED light are adjusted in real time, which greatly facilitates the use experience of users.

The present disclosure provides a linear drive circuit, comprising:

an alternating current (AC)-direct current (DC) module configured to obtain an AC input voltage control signal, and convert the AC input voltage control signal into a DC voltage control signal;

an LED module comprising at least two LED strings with different CCTs, and electrically connected to the AC-DC module through a first unidirectional conductive element;

a CCT and brightness control module electrically connected to the LED module, and configured to obtain a CCT control signal or a brightness control signal according to the DC voltage control signal, and adjust a CCT of each of the at least two LED strings in the LED module according to the CCT control signal; and a drive control module electrically connected to the AC-DC module, and to the CCT and brightness control module through a second unidirectional conductive element, and configured to receive the brightness control signal from the CCT and brightness control module, and adjust brightness of the LED module according to the brightness control signal.

In an embodiment, the CCT control signal comprises at least two pulse-width modulation (PWM) control signals, and the CCT and brightness control module comprises:

a signal detection unit; and
a switch control unit;

wherein the signal detection unit is electrically connected to the AC-DC module and is configured to detect the DC voltage control signal and generate a control voltage detection signal; the switch control unit is electrically connected to the LED module, a first control unit, and the drive control module, respectively; the first control unit is electrically connected to the signal detection unit and the switch control unit respectively, and is configured to receive the control voltage detection signal sent from the signal detection unit, and generate the CCT control signal according to the control voltage detection signal, and send each of the at least two PWM control signals to the switch control unit to adjust a current of each of the at least two LED strings, so that a CCT of the LED module is adjusted to a preset CCT; and the first control unit is further configured to generate the brightness control signal according to the control voltage detection signal, and send the brightness control signal to the drive control module.

In an embodiment, the drive control module comprises a second control unit and a linear current drive unit that are electrically connected, wherein the second control unit is further electrically connected to the AC-DC module, and the linear current drive unit is further electrically connected to the switch control unit through the second unidirectional conductive element;

the second control unit is configured to receive the brightness control signal sent from the first control unit, generate a reference voltage and a control signal according to the brightness control signal, and output the reference voltage and the control signal to the linear current drive unit; and the linear current drive unit is configured to adjust and control an output current in a loop corresponding to the LED module according to the reference voltage and the control signal, so as to adjust the brightness of the LED module.

In an embodiment, the signal detection unit comprises a first voltage divider resistor, a second voltage divider resistor, a switch tube, a reducing resistor, a filter capacitor, and a current limiting resistor;

the first voltage divider resistor and the filter capacitor are connected in parallel; a first terminal of the first voltage divider resistor and the filter capacitor connected in parallel, and a first end of the switch tube are both connected to a positive electrode of the second unidirectional conductive element; a second terminal of the first voltage divider resistor and the filter capacitor connected in parallel is electrically connected to a second end of the switch tube and one end of the second voltage divider resistor, respectively; the other end of the second voltage divider resistor is electrically connected to the AC-DC module; and a third end of the switch tube is electrically connected to the first control unit through the current limiting resistor.

In an embodiment, the second control unit comprises an optocoupler isolating subunit, a reference voltage control subunit, and a drive control chip that are electrically connected in sequence; the switch control unit comprises at least two switch tubes connected in parallel; a first end of each of the at least two switch tubes is electrically connected to the first control unit; a second end of each of the at least two switch tubes is electrically connected to a corresponding LED string of the at least two LED strings; and a third end of each of the at least two switch tubes is electrically connected to the linear current drive unit through the second unidirectional conductive element;

the second control unit further comprises a power supply regulator subunit; a primary input terminal of the optocoupler isolating subunit is electrically connected to the first control unit; a primary output terminal of the optocoupler isolating subunit is connected to a virtual ground; a secondary input terminal of the optocoupler isolating subunit is electrically connected to the AC-DC module through a pull-up resistor, or is electrically connected to the power supply regulator subunit; the power supply regulator subunit is electrically connected to the AC-DC module through a reducing resistor; a secondary output terminal of the optocoupler isolating subunit is electrically connected to the reference voltage control subunit; and the optocoupler isolating subunit is configured to receive and electrically isolate the brightness control signal, and send the brightness control signal which has been electrically isolated to the reference voltage control subunit;

the reference voltage control subunit is configured to generate a reference input voltage signal according to the brightness control signal which has been electrically isolated, and send the brightness control signal to the drive control chip;

the drive control chip is configured to generate the reference voltage and the control signal according to the reference input voltage signal, and send the reference voltage and the control signal to the linear current drive unit.

In an embodiment, the second control unit comprises a drive control chip, which is electrically connected to the first control unit; the switch control unit comprises at least two switch branches connected in parallel, and each of the at least two switch branches comprises an optocoupler isolating subunit and a switch tube connected in series; a primary input terminal of the optocoupler isolating subunit is connected to the first control unit through a current limiting resistor; a primary output terminal of the optocoupler isolating subunit is grounded; a secondary output terminal of the optocoupler isolating subunit is electrically connected to a first end of the switch tube; a second end of the switch tube is connected to a corresponding LED string of the at least two LED strings; and a third end of the switch tube is electrically connected to the linear current drive unit through the second unidirectional conductive element; and the drive control chip is configured to directly receive the brightness control signal sent from the first control unit, generate the reference voltage and the control signal according to the brightness control signal, and send the reference voltage and the control signal to the linear current drive unit.

In an embodiment, the second control unit comprises a power supply regulator subunit, a drive control chip and an optocoupler isolating subunit; the drive control chip and the optocoupler isolating subunit are respectively electrically connected to the linear current drive unit; and the linear current drive unit comprises a first switch tube and a second switch tube;

a primary input terminal of the optocoupler isolating subunit is electrically connected to the first control unit through a first current limiting resistor; a secondary output terminal of the optocoupler isolating subunit is connected to a first end of the second switch tube, and is grounded through a first ground resistor; a secondary input terminal of the optocoupler isolating subunit is electrically connected to the power supply regulator subunit through the second current limiting resistor; the power supply regulator subunit is further electrically connected to the AC-DC module through a first reducing resistor; and a second end of the second switch tube is grounded; and a first end of the first switch tube is electrically connected to the drive control chip and is grounded through a second ground resistor, and a second end of the first switch tube is connected to the second switch tube through a third current limiting resistor; the second end of the first switch tube is further electrically connected to the drive control chip through a second reducing resistor and a third reducing resistor connected in series; and a third end of the first switch tube is electrically connected to a negative electrode of the second unidirectional conductive element.

In an embodiment, the signal detection unit comprises a first signal detection subunit and a second signal detection subunit; the first control unit comprises a first power supply regulator subunit, a second power supply regulator subunit, a CCT control subunit, and a brightness control subunit;

the first signal detection subunit is electrically connected to the AC-DC module and the CCT control subunit, respectively; and the second signal detection subunit is electrically connected to the AC-DC module and the brightness control subunit, respectively;

the first power supply regulator subunit is electrically connected to a negative electrode of the first unidirectional conductive element and the CCT control subunit, respectively; and the second power supply regulator subunit is electrically connected to the negative electrode of the first unidirectional conductive element and the brightness control subunit, respectively;

the first signal detection subunit is configured to detect the DC voltage control signal; generate a CCT voltage detection signal; and send the CCT voltage detection signal to the CCT control subunit;

the CCT control subunit is configured to generate a CCT control signal according to the CCT voltage detection signal, and send each PWM control signal to the switch control unit to adjust a current of each LED string, so that the CCT of the LED module is adjusted to the preset CCT;

the second signal detection subunit is configured to detect the DC voltage control signal, generate a brightness voltage detection signal, generate a brightness control signal according to the brightness voltage detection signal, and send the brightness voltage detection signal to the brightness control subunit; and the brightness control subunit is configured to generate a brightness control signal according to the brightness voltage detection signal, and send the brightness voltage detection signal to the drive control module.

In an embodiment, the brightness control subunit is configured to send the brightness control signal to the second control unit; the second control unit comprises a drive control chip and a reference voltage adjustment subunit electrically connected; the linear current drive unit comprises a switch tube; a first end of the switch tube is electrically connected to the drive control chip and is grounded through a ground resistor; a second end of the switch tube is connected to the drive control chip through a first resistor and a second resistor connected in series; the first resistor are connected in parallel with a filter capacitor; and a third end of the switch tube is electrically connected to a negative electrode of the second unidirectional conductive element;

the reference voltage adjustment subunit is configured to receive the brightness control signal sent from the brightness control subunit, generate the reference voltage adjustment signal according to the brightness control signal, and send it to the drive control chip;

the drive control chip is configured to generate the reference voltage and the control signal according to the brightness control signal, and send the reference voltage and the control signal to the linear current drive unit.

In an embodiment, the brightness control subunit is configured to send the brightness control signal to the linear current drive unit; the linear current drive unit comprises a first switch tube and a second switch tube; a first end of the first switch tube is electrically connected to the drive control chip and is grounded through a ground resistor, and a second end of the first switch tube is connected to a first end of the second switch tube through a current limiting resistor; the second end of the first switch tube is further electrically connected to the drive control chip through a reducing resistor; a third end of the first switch tube is electrically connected to a negative electrode of the second unidirectional conductive element; and a second end of the second switch tube is electrically connected to the brightness control subunit; and a third end of the second switch tube is grounded.

In an embodiment, the first signal detection subunit and the second signal detection subunit have the same structure; the first signal detection subunit comprises a first voltage divider resistor, a second voltage divider resistor, a switch tube, a reducing resistor, and a current limiting resistor; the first voltage divider resistor and the filter capacitor are connected in parallel; a first terminal of the first voltage divider resistor and the filter capacitor connected in parallel, and a first end of the switch tube are both connected to a positive electrode of the second unidirectional conductive element; a second terminal of the first voltage divider resistor and the filter capacitor connected in parallel is respectively electrically connected to a second end of the switch tube and one end of the second voltage divider resistor; the other end of the second voltage divider resistor is electrically connected to the AC-DC module; a third end of the switch tube is electrically connected to the first power supply regulator unit through the reducing resistor, and is electrically connected to the CCT control subunit through the current limiting resistor.

In an embodiment, the CCT control signal comprises at least two PWM control signals, and the CCT and brightness control module comprises:

a signal detection unit; and
a switch control unit;
wherein the signal detection unit is electrically connected to the AC-DC module and is configured to detect the DC voltage control signal and generate a control voltage detection signal; the switch control unit is electrically connected to the LED module, a first control unit, and the drive control module, respectively; the first control unit is respectively electrically connected to the signal detection unit and the switch control unit, and is configured to receive the control voltage detection signal sent from the signal detection unit, generate a CCT control signal according to the control voltage detection signal, and send each of the at least two PWM control signals to the switch control unit to adjust a current of each of the at least two LED strings, so that a CCT of the LED module is adjusted to a preset CCT; and the first control unit is further configured to adjust a duty cycle of the CCT control signal, so that the switch control unit outputs a brightness control signal, and sends the brightness control signal to the drive control module through the second unidirectional conductive element.

In an embodiment, the first control unit comprises a power supply regulator subunit and a drive control chip; the signal detection unit is electrically connected to the power supply regulator subunit and the drive control chip, respectively; and the power supply regulator subunit is electrically connected to the drive control chip and a negative electrode of the first unidirectional conductive element, respectively.

In an embodiment, the drive control module comprises a second control unit and a linear current drive unit electrically connected; the second control unit is further electrically connected to the AC-DC module; and the linear current drive unit are further electrically connected with the switch control unit through the second unidirectional conductive element;

the second control unit is configured to control the linear current drive unit, so that the linear current drive unit drives the LED module to turn on the LED module;

the linear current drive unit is further configured to adjust and control a current of a loop corresponding to the LED module according to the brightness control signal, so as to adjust brightness of the LED module.

The present disclosure further provides an LED light, wherein the LED light is provided with the linear drive circuit.

In the linear drive circuit of the present invention, a DC voltage control signal is obtained by an AC-DC module. A corresponding CCT control signal or a brightness control signal is obtained by a CCT and brightness control module. The CCT of each LED string in the LED module is adjusted according to the CCT control signal. Finally, the drive control module receives the brightness control signal sent from the CCT and brightness control module, and adjusts the brightness of the LED module according to the brightness control signal, so as to adjust the CCT and brightness of the LED light, which greatly facilitates the use experience of users.

BRIEF DESCRIPTION OF THE DRAWINGS

The present disclosure will be described as follows with reference to the embodiments and accompanying drawings. It should be understood that the following drawings are intended to show certain embodiments of the present disclosure, and therefore should not be regarded as limiting the protection scope of the present disclosure, in which the same component share the same numeral in the drawings.

DETAILED DESCRIPTION OF EMBODIMENTS

Figure 1:
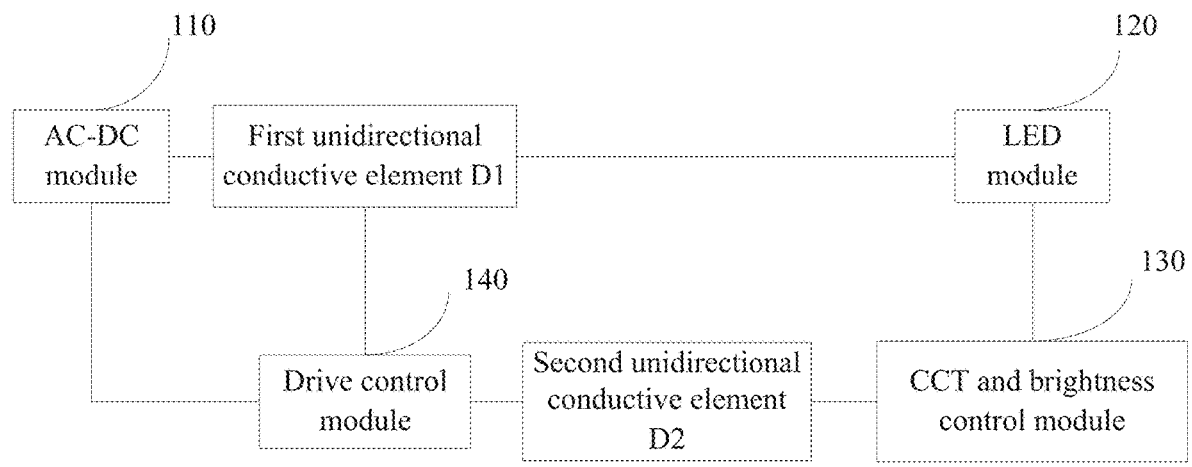
FIG. 1 is a block diagram of a linear drive circuit according to some embodiments of the present disclosure.

The present disclosure will be further described in detail below with reference to the accompanying drawings and embodiments. Obviously, the embodiments described below are only a part of the embodiments of the present disclosure.

The components illustrated in the drawings may be arranged and designed in various different configurations. Therefore, the following detailed description of the embodiments of the present disclosure is not intended to limit the scope of the invention, and the embodiments provided herein merely represents preferred embodiments of the present disclosure. Based on the embodiments of the present disclosure, all other embodiments obtained by those skilled in the art without creative work shall fall within the protection scope of the present disclosure.

It should be further understood that terms such as "comprising" and "having" used in embodiments of the present disclosure refer to the presence of the described features, integers, steps, operations, elements and/or components, but does not exclude the presence or addition of one or more other features, integers, steps, operations, elements, components, and/or combinations thereof.

In addition, terms "first", "second", "third", etc. are for ease of description, and should not be understood as indicating or implying relative importance.

Unless otherwise defined, all terms (including technical terms and scientific terms) used herein have the same meanings as commonly understood by those of ordinary skill in the art to which the present disclosure belongs. It should be understood that terms such as those defined in general dictionaries should be understood to have a meaning consistent with the meaning in the context of the prior art, and unless specified herein, such terms will not be interpreted in an idealized or overly formal meaning.

Embodiment 1

As shown in FIG. 1, the embodiment provides a linear drive circuit for an LED light, including an AC-DC module 110, a LED module 120, a first unidirectional conductive element D1, a second unidirectional conductive element D2, a CCT and brightness control module 130, and a drive control module 140.

The AC-DC module 110 is electrically connected to the LED module 120 through the first unidirectional conductive element D1, and is configured to obtain an AC input voltage control signal and convert the AC input voltage control signal into a DC voltage control signal corresponding to the AC input voltage control signal.

The AC input voltage control signal can be a single trigger signal or continuous trigger signals.

The LED module 120 includes at least two LED strings with different CCTs. Specifically, the LED module 120 generally includes at least one LED string with a high CCT and one LED string with a low CCT.

The CCT and brightness control module 130 is electrically connected to the LED module 120, and is configured to obtain a CCT control signal or a brightness control signal according to the DC voltage control signal, and control a CCT of each LED string in the LED module 120 according to the CCT control signal.

The CCT and brightness control module 130 controls a ratio of a current of the LED string with a high CCT to a current of the LED string with a low CCT, so that the CCT of the LED module 120 is seamlessly switched into CCTs between the low CCT and the high CCT of the LED strings. Moreover, the CCT and brightness control module 130 can further output a corresponding brightness control signal to the drive control module 140.

The drive control module 140 is electrically connected to the AC-DC module 110, and is electrically connected to the CCT and brightness control module 130 through the second unidirectional conductive element D2. The drive control module 140 is configured to receive the brightness control signal sent from the CCT and brightness control module 130, and adjust the brightness of the LED module 120 according to the brightness control signal.

In the above-mentioned linear drive circuit of the LED light, the DC voltage control signal is obtained by the AC-DC module; a corresponding CCT control signal or a brightness control signal is obtained by a CCT and brightness control module; the CCT of each LED string in the LED module is adjusted according to the CCT control signal; finally, the drive control module receives the brightness control signal sent from the CCT and brightness control module, and adjust the brightness of the LED module according to the brightness control signal, so as to adjust the CCT and brightness of the LED light in real time, which greatly improves the use experience.

Embodiment 2

Figure 2:
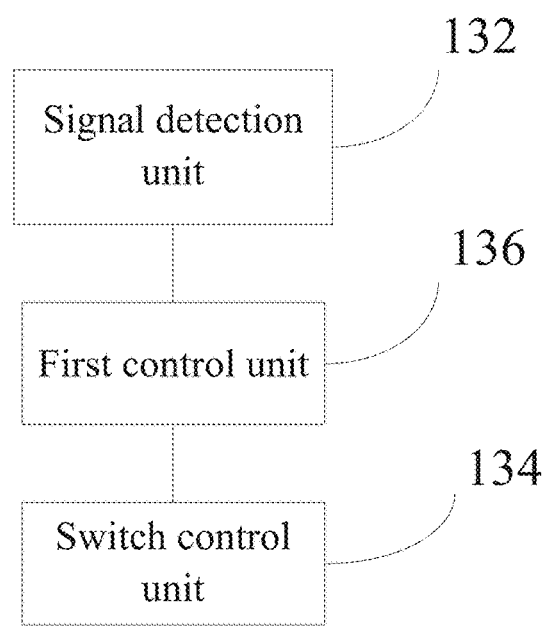
FIG. 2 is a block diagram of a CCT and brightness control module according to some embodiments of the present disclosure.

This embodiment is based on Embodiment 1, and the CCT control signal includes at least two PWM control signals. As shown in FIG. 2, the CCT and brightness control module 130 includes:

a signal detection unit 132, which is electrically connected to the AC-DC module 110, and is configured to detect the DC voltage control signal and generate a control voltage detection signal;

a switch control unit 134, which is electrically connected to the LED module 120 and a first control unit 136, and to the drive control module 140 through the second unidirectional conductive element D2; and the first control unit 136, which is electrically connected to the signal detection unit 132 and the switch control unit 134, and is configured to receive the control voltage detection signal sent from the signal detection unit 132, generate a CCT control signal according to the control voltage detection signal, and respectively send each PWM control signal to the switch control unit 134 to adjust the current of each LED string, so as to adjust the CCT of the LED module 120 to a preset CCT.

The first control unit 136 is further configured to generate a brightness control signal according to the control voltage detection signal, and send the brightness control signal to the drive control module 140.

In this embodiment, the drive control module 140 includes a second control unit 142 and a linear current drive unit 144 electrically connected, where the second control unit 142 is further electrically connected to the AC-DC module 110, and the linear current drive unit 144 is further electrically connected to the switch control unit 134 through the second unidirectional conductive element.

The second control unit 142 is configured to receive the brightness control signal sent from the first control unit 136, generate a reference voltage and control signal corresponding to the brightness control signal, and output the reference voltage and the control signal to the linear current drive unit 144.

The linear current drive unit 144 is configured to adjust and control the output current of the conduction circuit loop corresponding to the LED module 120 according to the reference voltage and the control signal, so as to adjust the brightness of the LED module 120.

Embodiment 3

Figure 3:
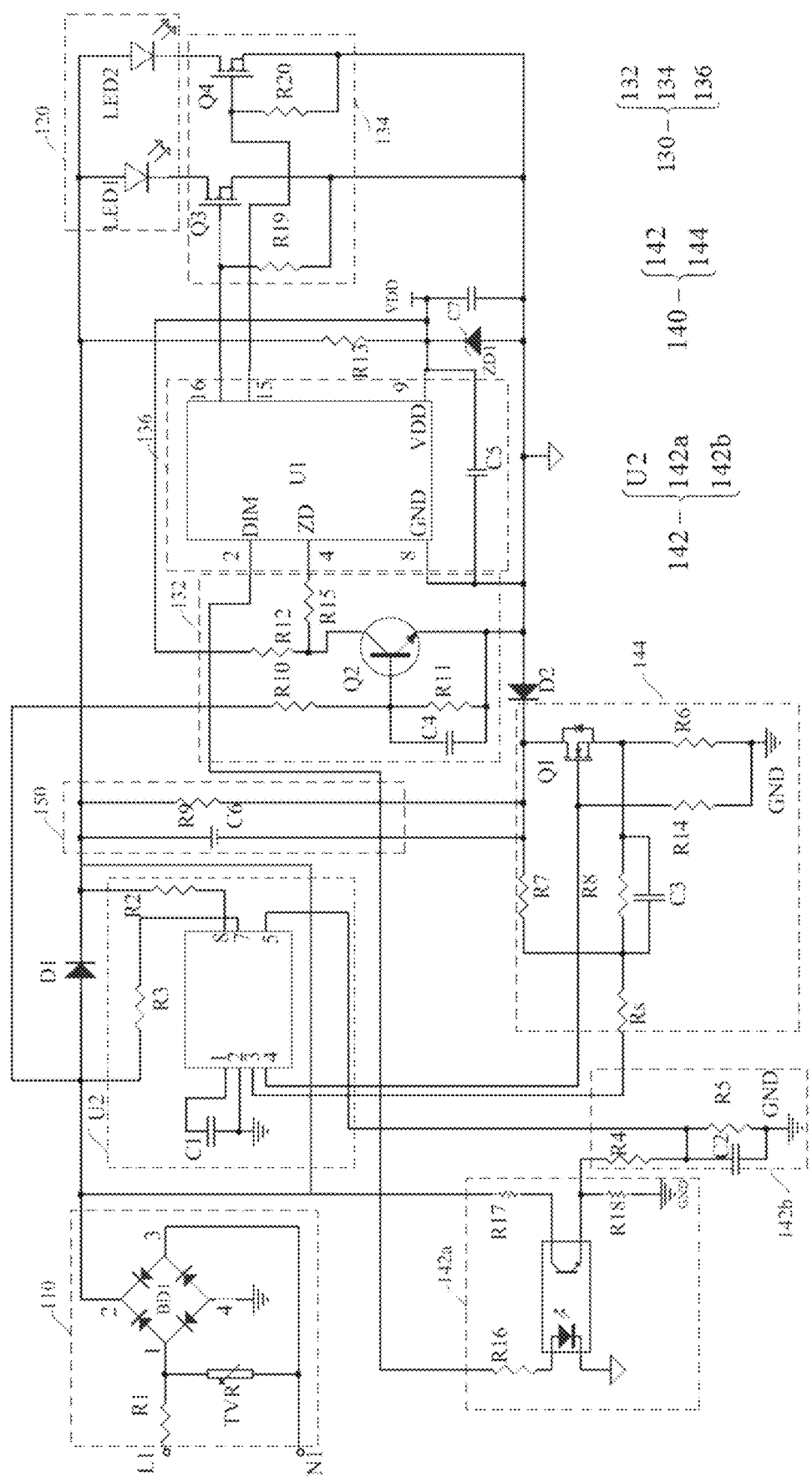
FIG. 3 is a circuit diagram of the linear drive circuit according to some embodiments of the present disclosure.

As shown in FIG. 3, in this embodiment, the first unidirectional conductive element D1 and the second unidirectional conductive element D2 both adopt fast recovery diodes, and the AC-DC power supply module 110 adopts a buck regulator rectifier circuit, where the buck regulator rectifier circuit includes a resistor R1, a varistor TVR and a rectifier bridge BD1. A first AC input terminal 1 of the rectifier bridge BD1 is connected to a positive electrode L1 of a power supply through the resistor R1; a second AC input terminal 3 of the rectifier bridge BD1 is connected to a negative electrode N1 of the power supply; a first DC output terminal 2 of the rectifier bridge BD1 is connected to the first unidirectional conductive element D1, and a second DC output terminal 4 of the rectifier bridge BD1 is grounded. One end of the varistor TVR is connected to the resistor R1 and the first AC input terminal 1, and the other end of the varistor TVR is connected to the negative electrode N1 of the power supply.

As shown in FIG. 3, the LED module 120 includes LED1 and LED2 having different CCTs. The second control unit 142 includes an optocoupler isolator subunit 142a, a reference voltage control subunit 142b, and a drive control chip U2 that are electrically connected in sequence. In the drive control chip U2, a pin 1 of the drive control chip U2 is grounded through a capacitor C1; a pin 2 of the drive control chip U2 is grounded; a pin 3 of the drive control chip U2 is electrically connected to the linear current drive unit 144 through a resistor Rs; a pin 4 of the drive control chip U2 is connected to a gate of a switch tube Q1; a pin 8 of the drive control chip U2 is connected to a negative electrode of the first unidirectional conductive element D1 through a high-voltage starting resistor R2; and a pin 7 of the drive control chip U2 is electrically connected to the AC-DC module through a resistor R3.

The pin 3 of the drive control chip U2 is connected to the linear current drive unit 144 through the resistor Rs, and is configured to provide a reference voltage for the linear current drive unit 144.

When a voltage of the pin 8 is higher than a preset voltage starting value, the drive control chip U2 can be started.

In the linear current drive unit 144, the switch tube Q1 adopts a MOS transistor, where a gate of the switch tube Q1 is grounded through a ground resistor R14, and is further connected to the pin 4 of the drive control chip U2. A source of the switch tube Q1 is grounded through the ground resistor R6. A resistor R8 and a capacitor C3 are connected in parallel, where a first terminal of the resistor R8 and the capacitor C3 connected in parallel is electrically connected to the source of the switch tube Q1, and a second terminal of the resistor R8 and the capacitor C3 connected in parallel is respectively electrically connected to an end of the resistor Rs and one end of a current limiting resistor R7. The other end of the current limiting resistor R7 is electrically connected to a drain of the switch tube Q1; and the drain of the switch tube Q1 is further connected to a negative electrode of the second unidirectional conductive element D2.

The switch control unit 134 includes two switch tubes Q3 and Q4 connected in parallel, where the switch tube Q3 and the switch tube Q4 are both MOS switch tubes. A first end (gate) of the switch tube Q3 and a first end (gate) of the switch tube Q4 are electrically connected to the first control unit 136, respectively. A second end (drain) of the switch tube Q3 and a second end (drain) the switch tube Q4 are electrically connected to the corresponding LED strings, respectively. A third end (source) of the switch tube Q3 and a third end (source) of the switch tube Q4 are electrically connected to the linear current drive unit 144 through the second unidirectional conductive element D2, respectively.

A primary input terminal of the optocoupler isolating subunit 142a is electrically connected to the first control unit 136 through a resistor R16, and a primary output terminal of the optocoupler isolating subunit 142a is connected to a common virtual ground. A secondary input terminal of the optocoupler isolating subunit 142a is electrically connected to the AC-DC module 110 through a resistor R17, and a secondary output terminal of the optocoupler isolating subunit 142a is electrically connected to the reference voltage control subunit 142b, where the optocoupler isolating subunit 142a is configured to receive the brightness control signal and electrically isolate the brightness control signal, and then send the brightness control signal electrically isolated to the reference voltage control subunit 142b.

The secondary output terminal of the optocoupler isolating subunit 142a is grounded through a resistor R18, and the reference voltage control subunit 142b includes a resistor R4, a resistor R5 and a capacitor C2. The resistor R5 and the capacitor C2 are connected in parallel, where a first terminal of the resistor R5 and the capacitor C2 connected in parallel is electrically connected to an end of the resistor R4 and a DIM pin 5 of the drive control chip U2, respectively, and the other end of the resistor R4 is electrically connected to the AC-DC module 110; and a second terminal of the resistor R5 and the capacitor C2 connected in parallel is grounded.

The reference voltage control subunit 142b is configured to generate a reference input voltage signal according to the brightness control signal electrically isolated, and send the reference input voltage signal to the drive control chip U2.

The drive control chip U2 is configured to generate a reference voltage and a control signal according to the brightness control signal electrically isolated, and send the reference voltage and the control signal to the linear current drive unit 144.

The signal detection unit 132 includes a first voltage divider resistor R11, a second voltage divider resistor R10, a switch tube Q2, a reducing resistor R12, and a current limiting resistor R15, where the switch tube Q2 is an NPN transistor. The first voltage divider resistor R11 and a filter capacitor C4 are connected in parallel, where a first terminal of the first voltage divider resistor R11 and a filter capacitor C4 connected in parallel, and an emitter of the switch tube Q2 are both connected to a positive electrode of the second unidirectional conductive element D2, and a second terminal of the first voltage divider resistor R11 and a filter capacitor C4 connected in parallel is respectively electrically connected to a base of the switch tube Q2 and one end of the second voltage divider resistor R10; the other end of the second voltage divider resistor R10 is electrically connected to the AC-DC module 110; and a collector of the switch tube Q2 is electrically connected to the first control unit 136 through the current limiting resistor R15.

In the switch control unit 134, a gate of the switch tube Q3 is grounded through a resistor R19, and a gate of the switch tube Q4 is grounded through a resistor R20.

A pin 8 and a pin 9 of the drive control chip U1 are connected through a capacitor C5. The drive control chip U1 outputs a PWM signal to the gate of the switch tube Q4 through a pin 15, and outputs a PWM signal to the gate of the switch tube Q3 through a pin 16. A pin 9 (VDD) of the drive control chip U1 is connected to a negative electrode of the first unidirectional conductive element D1 through a resistor R13, and the pin 9 (VDD) is further connected to a zener diode ZD1 and a filter capacitor C7, where the zener diode ZD1, the resistor R13, and the filter capacitor C7 are configured to provide a stable power supply voltage VDD for the drive control chip U1. The pin 2 of the drive control chip U1 is electrically connected to the primary input terminal of the optocoupler isolating subunit 142a through the resistor R16; a pin 4 of the drive control chip U1 is connected to the collector of the switch tube Q2 through the current limiting resistor R15; and the pin 9 of the drive control chip U1 is further connected to the virtual ground through the capacitor C5.

The collector of the switch tube Q2 is further connected to the power supply voltage (VDD) through a resistor R12.

The drive control chip U1 may be a 16-bit microcontroller or an 8-bit microcontroller, and the drive control chip U2 can be a linear drive IC.

The linear drive circuit in this embodiment is further provided with an anti-flash module 150 which includes a capacitor C6 and a resistor R9 connected in parallel, where a first terminal of the capacitor C6 and the resistor R9 connected in parallel is electrically connected to the AC-DC module 110 through the first unidirectional conductive element D1, and a second terminal of the capacitor C6 and the resistor R9 connected in parallel is electrically connected to the negative electrode of the second unidirectional conductive element D2. When the LED module 120 is turned off, a bleeder circuit is formed by the LED module 120 and the resistor R9 to avoid the flashing of the LED module 120.

During the operation of the linear drive circuit in this embodiment, the signal detection unit 132 detects the DC voltage control signal, generates a corresponding control voltage detection signal, and then sends the control voltage detection signal to the drive control chip U1 through the pin 4 of the drive control chip U1. The drive control chip U1 generates a corresponding CCT control signal according to the control voltage detection signal (i.e., two PWM control signals in this embodiment), and sends each PWM control signal to the switch control unit 134 to adjust the current of each LED string, so as to adjust the CCT of the LED module 120 to a preset CCT. The drive control chip U1 is further configured to generate a corresponding brightness control signal according to the control voltage detection signal and send the brightness control signal to the optocoupler isolating subunit 142a through the resistor R16, where the optocoupler isolating subunit 142a is configured to isolate the brightness control signal, and further send the isolated brightness control signal to the reference voltage control subunit 142b. The reference voltage control subunit 142b further generates a reference input voltage signal, and send it to the drive control chip U2 through the pin 5 of the drive control chip U2. The drive control chip U2 generates a reference voltage and a control signal according to the reference input voltage signal, and sends them to the linear current drive unit 144, so as to adjust the gate voltage and the source voltage of the switch tube Q1 in the linear current drive unit 144, thereby adjusting the current magnitude of the loop corresponding to the switch tube Q1. Since the conduction circuit loop corresponding to the switch tube Q1 is a conduction circuit loop corresponding to the LED module 120, the brightness of the LED module 120 is adjusted accordingly. The pin 3 of the drive control chip U2 outputs the reference voltage through the resistor Rs, and the pin 4 of the drive control chip U2 provides a voltage signal for the gate of the switch tube Q1.

The LED module 120, the current limiting resistor R7 and the resistor R8 form another current loop. Since the reference voltage is kept unchanged, when the output voltage of the negative electrode of the LED module 120 (that is, the drain voltage of the switch tube Q1, where the voltage drop of the switch tube is omitted) becomes larger, the voltage of the ground resistor R6 decreases, and the current of the ground resistor R6 decreases accordingly. Since the current of the ground resistor R6 is approximately equal to the current of the LED module 120, the current of the LED module 120 decreases accordingly, thereby protecting the LED module 120.

When the LED module 120 is short-circuited, the reference voltage instantly increases, so that the switch tube Q1 is turned off in time, and the corresponding small current forms a loop through the current limiting resistor R7, the resistor R8, and the ground resistor R6, thereby preventing the switch tube Q1 from being burnt.

Embodiment 4

Figure 4:
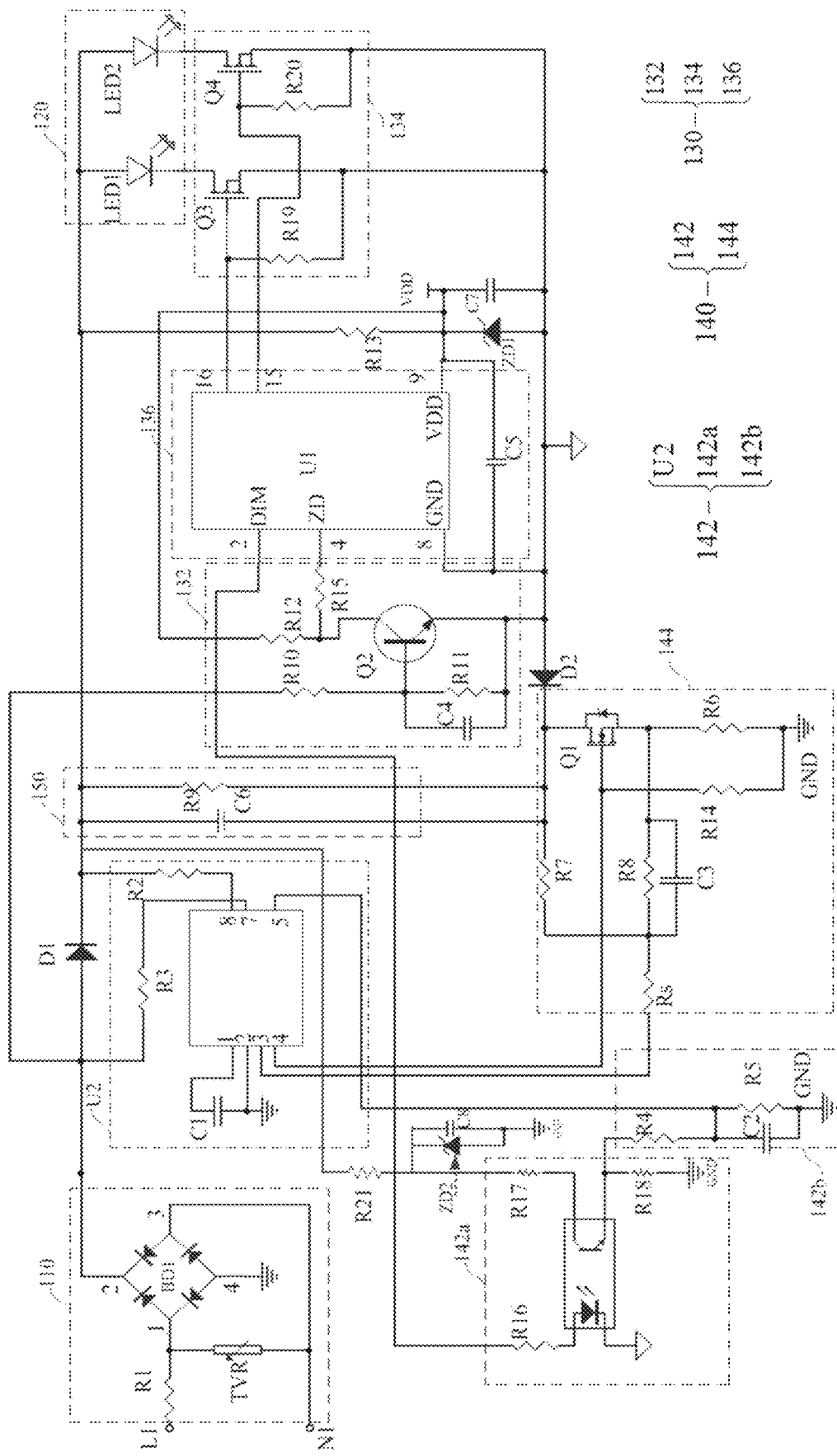
FIG. 4 is a circuit diagram of the linear drive circuit according to some embodiments of the present disclosure.

As shown in FIG. 4, the linear drive circuit in this embodiment is different from the linear drive circuit in Embodiment 3 except that a stabilized power supply including a zener diode ZD2, a capacitor C8 and a pull-up resistor R21 is connected to the secondary input terminal of the optocoupler isolating subunit 142a, and the pull-up resistor R21 is connected to the negative electrode of the first unidirectional conductive element D1.

By providing a high-quality power signal for the optocoupler isolating subunit 142a, the linear drive circuit of this embodiment has an improved anti-interference ability and sensitivity.

Embodiment 5

Figure 5:
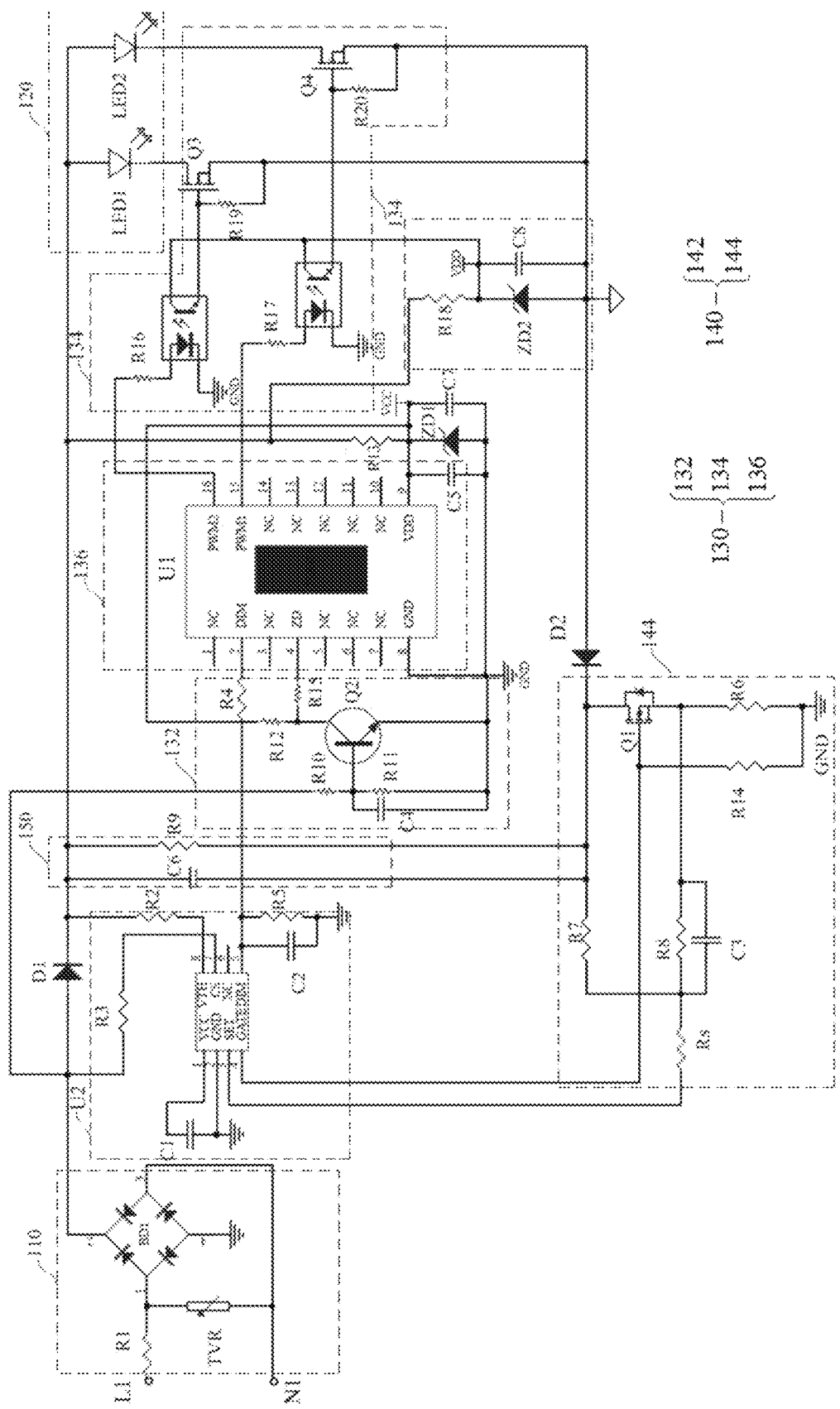
FIG. 5 is a circuit diagram of the linear drive circuit according to some embodiments of the present disclosure.

As shown in FIG. 5, this embodiment is based on the Embodiment 2, and the AC-DC module 110, the anti-flash module 150, the LED module 120, the drive control chip U1, the drive control chip U2, the signal detection unit 132 and the linear current drive unit 144 are the same as respective units in the linear drive circuit of Embodiment 3.

The second control unit 142 includes a drive control chip U2 which is electrically connected to the first control unit 136. The switch control unit 134 includes two switch branches connected in parallel (one switch branch is described herein as an example), where one of the switch branches includes an optocoupler isolating subunit 134a and a switch tube Q3 connected in series, and a primary input terminal of the optocoupler isolating subunit 134a is electrically connected to a pin 16 of the drive control chip U1 in the first control unit 136 through the current limiting resistor R16, and a primary output terminal of the optocoupler isolating subunit 134a is grounded. The secondary output terminal of the optocoupler isolating subunit 134a is electrically connected to a gate of the switch tube Q3; a drain of the switch tube Q3 is connected to the an LED string LED1; and a source of the switch tube Q3 is electrically connected to the switch tube Q1 in the linear current drive unit 144 through the second unidirectional conductive element D2. The other switch branch includes an optocoupler isolating subunit 134b and a switch tube Q4, where the corresponding structure and connection mode are the same as those of the above-mentioned switch branch. Specifically, R17 is a current limiting resistor. The gate of the switch tube Q4 is connected to the virtual ground through a resistor R20. The gate of the switch tube Q3 is connected to the virtual ground through the resistor R19, and the drain of the switch tube Q4 is connected to an LED string LED2.

The resistor R18, the zener diode ZD2 and the capacitor C8 constitute a voltage-stabilized source VDD, where the secondary input terminals of the optocoupler isolating subunit 134b and the optocoupler isolating subunit 134a are respectively connected to the voltage-stabilized source VDD. The resistor R13, the zener diode ZD1 and the capacitor C7 form another voltage-stabilized source VCC, where the pin 9 of the drive control chip U1 is connected to the voltage-stabilized source VCC.

The drive control chip U2 is configured to receive the brightness control signal sent from the first control unit 136, generate a reference voltage and a control signal according to the brightness control signal, and send the reference voltage and the control signal to the linear current drive unit 144.

As shown in FIG. 5, the linear drive circuit in this embodiment further includes a capacitor C2 and a resistor R5 connected in parallel, where a first terminal of the capacitor C2 and the resistor R5 connected in parallel is grounded, and a second terminal of the capacitor C2 and the resistor R5 connected in parallel is connected to the pin 5 of the drive control chip U2. The capacitor C2 and the resistor R5 are configured to filter the brightness control signal input from the pin 5 of the drive control chip U2.

During the operation of the linear drive circuit in this embodiment, the voltage detection unit 132 detects the DC voltage control signal, generates a corresponding control voltage detection signal, and then sends the corresponding control voltage detection signal to the drive control chip U1 through a corresponding pin 4 of the drive control chip U1. The drive control chip U1 generates a CCT control signal (two PWM control signals) according to the control voltage detection signal, and sends each PWM control signal to the optocoupler isolating subunit to isolate the PWM control signal, and then the isolated CCT control signal is sent to the corresponding LED string to adjust the current of the LED string, so that the CCT of the LED module 120 is adjusted to the preset CCT. The drive control chip U1 is further configured to generate a corresponding brightness control signal according to the control voltage detection signal and send the brightness control signal to the drive control chip U2 through the resistor R14. The drive control chip U2 generates a reference voltage and a control signal according to the reference input voltage signal, and sends them to the linear current drive unit 144 to adjust the gate voltage and the source voltage of the switch tube Q1 in the linear current drive unit 144, thereby adjusting the current magnitude of the loop corresponding to the switch tube Q1. Since the conduction circuit loop corresponding to the switch tube Q1 is a conduction circuit loop corresponding to the LED module 120, the brightness of the LED module 120 is adjusted accordingly, where the pin 3 of the drive control chip U2 outputs the reference voltage through the resistor Rs, and the pin 4 provides a voltage signal for the gate of the switch tube Q1.

Embodiment 6

Figure 6:
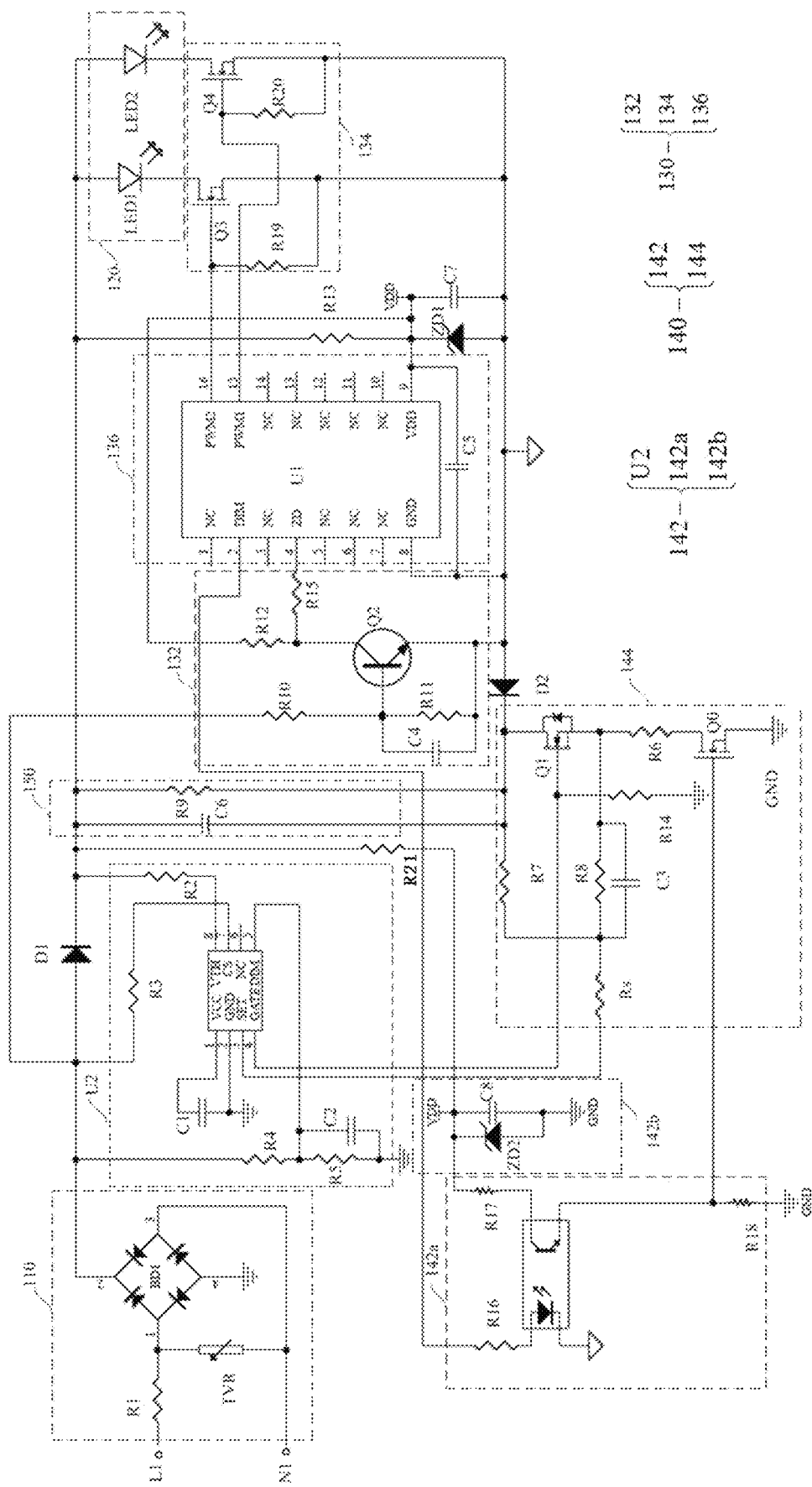
FIG. 6 is a circuit diagram of the linear drive circuit according to some embodiments of the present disclosure.

As shown in FIG. 6, in this embodiment, the AC-DC module 110, the LED module 120, the signal detection unit 132, the switch control unit 134, the drive control chip U1, the anti-flash module 150, the drive control chip U2, and the optocoupler isolating subunit 142a are the same as those of the Embodiment 4. Specifically, differences between the linear drive circuit of this embodiment and that of Embodiment 4 are as follows.

The second control unit 142 includes an optocoupler isolating subunit 142a, a power supply regulator subunit 142b, and a drive control chip U2, where the drive control chip U2 and the optocoupler isolating subunit 142a are respectively electrically connected to the linear current drive unit 144. The linear current drive unit 144 includes a first switch tube Q1 and a second switch tube Q0. A primary input terminal of the optocoupler isolating subunit 142a is electrically connected to the first control unit 136 through a first current limiting resistor R16. A secondary output terminal of the optocoupler isolating subunit 142a is electrically connected to a gate of the second switch tube Q0 and is grounded through a first ground resistor R18. A secondary input terminal of the optocoupler isolating subunit 142a is electrically connected to the power supply regulator subunit 142b through a second current limiting resistor R17. The power supply regulator subunit 142b is further electrically connected to the negative electrode of the first unidirectional conductive element D1 through a first reducing resistor R21, and a second end of the second switch tube Q0 is grounded.

A gate of the first switch tube Q1 is electrically connected to the drive control chip U1 and is grounded through a second ground resistor R14; a source of the first switch tube Q1 is connected to a drain of the second switch tube Q0 through a third current limiting resistor R6; and the source of the first switch tube Q1 is further electrically connected to the drive control chip U1 through a second reducing resistor Rs and a third reducing resistor R8 connected in series; and a drain of the first switch tube Q1 is electrically connected to a negative electrode of the unidirectional conductive element D2. The source of the second switch tube Q0 is grounded.

The resistor R5 and the capacitor C2 are connected in parallel, where a first terminal of the resistor R5 and the capacitor C2 connected in parallel is respectively connected to the pin 5 of the drive control chip U1 and the resistor R4, and a second terminal of the resistor R5 and the capacitor C2 connected in parallel is grounded. The resistor R4, the resistor R5 and the capacitor C2 are configured to output voltage signals so as to provide a reference voltage drive control signal for the drive control chip U1.

When the linear current drive unit 144 is adjusting the brightness, the first switch tube Q1 is on, and the optocoupler isolating subunit 142a controls the state of the second switch tube Q0 through the brightness control signal, so as to adjust the magnitude of the conduction current corresponding to that of the first switch tube Q1, and further adjust the current magnitude of the loop corresponding to the LED module 120, so that the brightness of the LED module 120 is adjusted.

Embodiment 7

Figure 7:
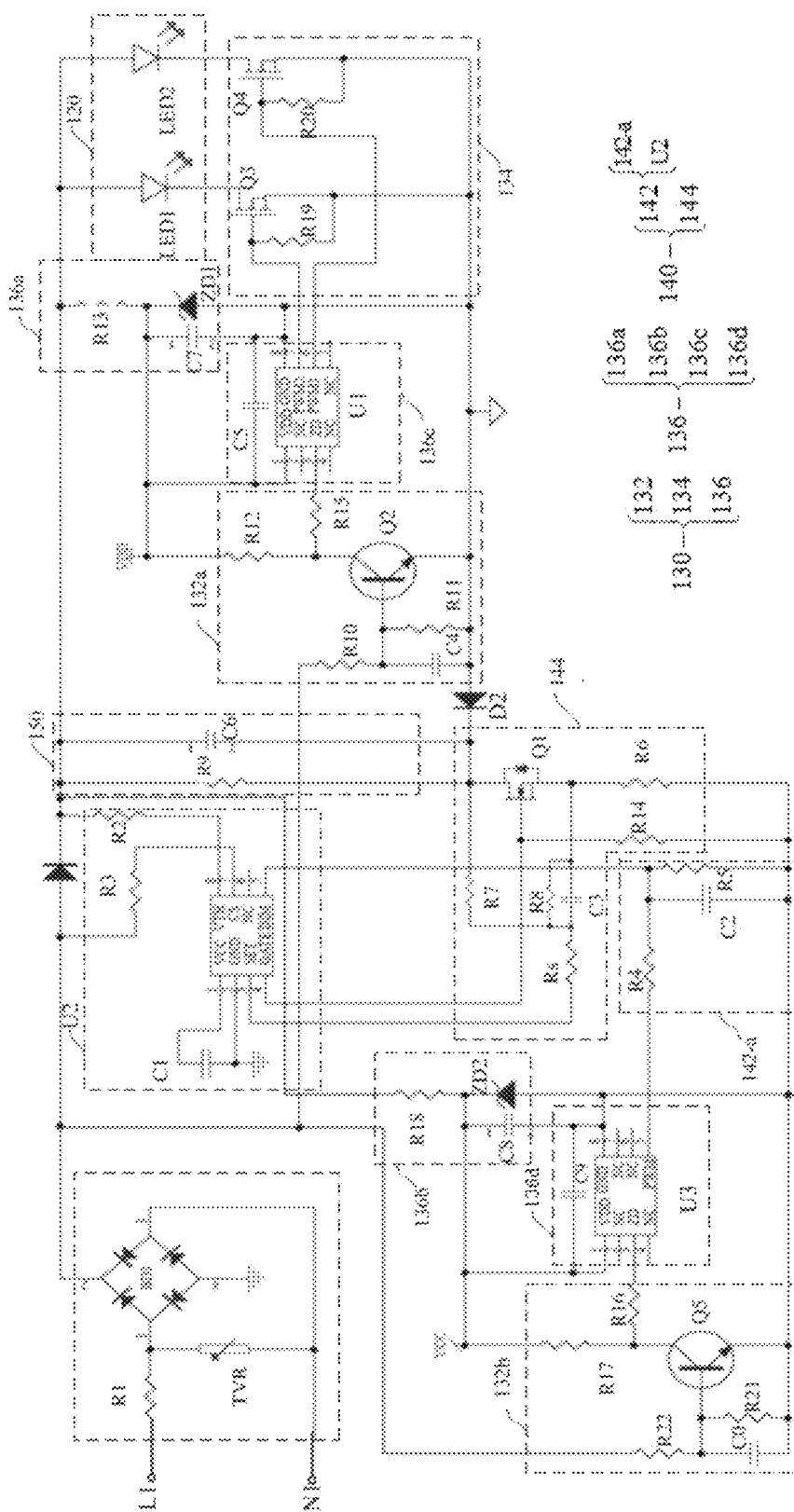
FIG. 7 is a circuit diagram of the linear drive circuit according to some embodiments of the present disclosure.

As shown in FIG. 7, the linear drive loop of this embodiment is similar to that of the Embodiment 5. The AC-DC module 110, the anti-flash module 150, the LED module 120, the drive control chip U2, the switch control unit 134, and the linear current drive unit 144 in this embodiment are the same as those in Embodiment 5.

The signal detection unit 132 includes a first signal detection subunit 132a and a second signal detection subunit 132b. The first control unit 136 includes a first power supply regulator subunit 136a, a second power supply regulator subunit 136b, a CCT control subunit 136c and a brightness control subunit 136d.

The first signal detection subunit 132a is electrically connected to the AC-DC module and the CCT control subunit 136c; and the second signal detection subunit 132b is electrically connected to the AC-DC module and the brightness control subunit 136d, respectively.

The first power supply regulator subunit 136a is electrically connected to the negative electrode of the first unidirectional conductive element D1 and the CCT control subunit 136c, respectively; and the second power supply regulator subunit 136b is respectively electrically connected to the negative electrode of the first unidirectional conductive element D1 and the brightness control subunit 136d.

The first signal detection subunit 132a is configured to detect the DC voltage control signal, generate a CCT voltage detection signal, and send it to the CCT control subunit 136c.

The CCT control subunit 136c is configured to generate the corresponding CCT control signal according to the CCT voltage detection signal, and send each PWM control signal to the switch control unit 134 to adjust the current flowing through each LED string, thereby adjusting the CCT of the LED module to the preset CCT.

The CCT control subunit 136c adopts a drive control chip U1, where the drive control chip U1 can adopt an 8-bit microcomputer.

The second signal detection subunit 132b is configured to detect the DC voltage control signal; generate a brightness voltage detection signal; generate a corresponding brightness control signal according to the brightness voltage detection signal, and send it to the brightness control subunit 136d.

The brightness control subunit 136d is configured to generate a corresponding brightness control signal according to the brightness voltage detection signal, and send it to the drive control module 140.

The brightness control subunit 136d is further configured to send the brightness control signal to the second control unit 142. The second control unit 142 includes a drive control chip U2 and a reference voltage adjustment subunit 142-a that are electrically connected. The reference voltage adjustment subunit 142-a is configured to receive the brightness control signal sent from the brightness control subunit 136d; generate the reference voltage adjustment signal according to the brightness control signal; and send it to the drive control chip U2. The drive control chip U2 is configured to generate a reference voltage and a control signal according to the brightness control signal, and send them to the linear current drive unit 144.

Specifically, the brightness control subunit 136d adopts a drive control chip U3 which is an 8-bit microcomputer. A pin 5 of the drive control chip U3 outputs the brightness control signal to the reference voltage adjustment subunit 142-a.

The reference voltage adjustment subunit 142-a includes a resistor R4, a resistor R5 and a capacitor C2. The resistor R5 and the capacitor C2 are connected in parallel, and a first terminal of the resistor R5 and the capacitor C2 connected in parallel is electrically connected to one end of the resistor R4 and the pin 5 (DIM) of the drive control chip U2; the other end of the resistor R4 is electrically connected to the brightness control subunit 136d; and a second terminal of the resistor R5 and the capacitor C2 connected in parallel is grounded.

The first signal detection subunit 132a and the second signal detection subunit 132b have the same structure, where a structure of the first signal detection subunit 132a is described herein as an example. Specifically, the first signal detection subunit 132a includes a first voltage divider resistor R11, a second voltage divider resistor R10, a switch tube Q2, a reducing resistor R12 and a current limiting resistor R15, where the switch tube Q2 is an NPN transistor. The first voltage divider resistor R11 and a filter capacitor C4 are connected in parallel, and a first terminal of the first voltage divider resistor R11 and the filter capacitor C4 connected in parallel, and an emitter of the switch tube Q2 are both connected to a positive electrode of the second unidirectional conductive element D2; a second terminal of the first voltage divider resistor R11 and the filter capacitor C4 connected in parallel is respectively connected to a base electrode of the switch tube Q2 and one end of the second voltage divider resistor R10; and the other end of the second voltage divider resistor R10 is electrically connected to the AC-DC module 110. A collector of the switch tube Q2 is electrically connected to the first control unit 136 through the current limiting resistor R15.

During the operation of the linear drive circuit in this embodiment, the first signal detection subunit 132a detects the DC voltage control signal; generates the CCT voltage detection signal, and sends it to the CCT control subunit 136c. The second signal detection subunit 132b detects the DC voltage control signal, generates a brightness voltage detection signal; generates a corresponding brightness control signal according to the brightness voltage detection signal, and sends it to the brightness control subunit 136d. The CCT control subunit 136c generates a corresponding CCT control signal according to the CCT control signal, and respectively sends each PWM control signal to the switch control unit 134 to adjust the current of each LED string, thereby adjusting the CCT of the LED module to the preset CCT. The brightness control subunit 136d sends the brightness control signal to the reference voltage adjustment subunit 142-a in the second control unit 142, generates the reference voltage adjustment signal according to the brightness control signal, and sends it to the drive control chip U2. Finally, the drive control chip U2 generates the corresponding reference voltage and the control signal according to the brightness control signal, and sends them to the linear current drive unit 144, so as to adjust the current magnitude of the loop corresponding to the LED module 120 through the linear current drive unit 144, so that the brightness of the LED module 120 is adjusted.

Embodiment 8

Figure 8:
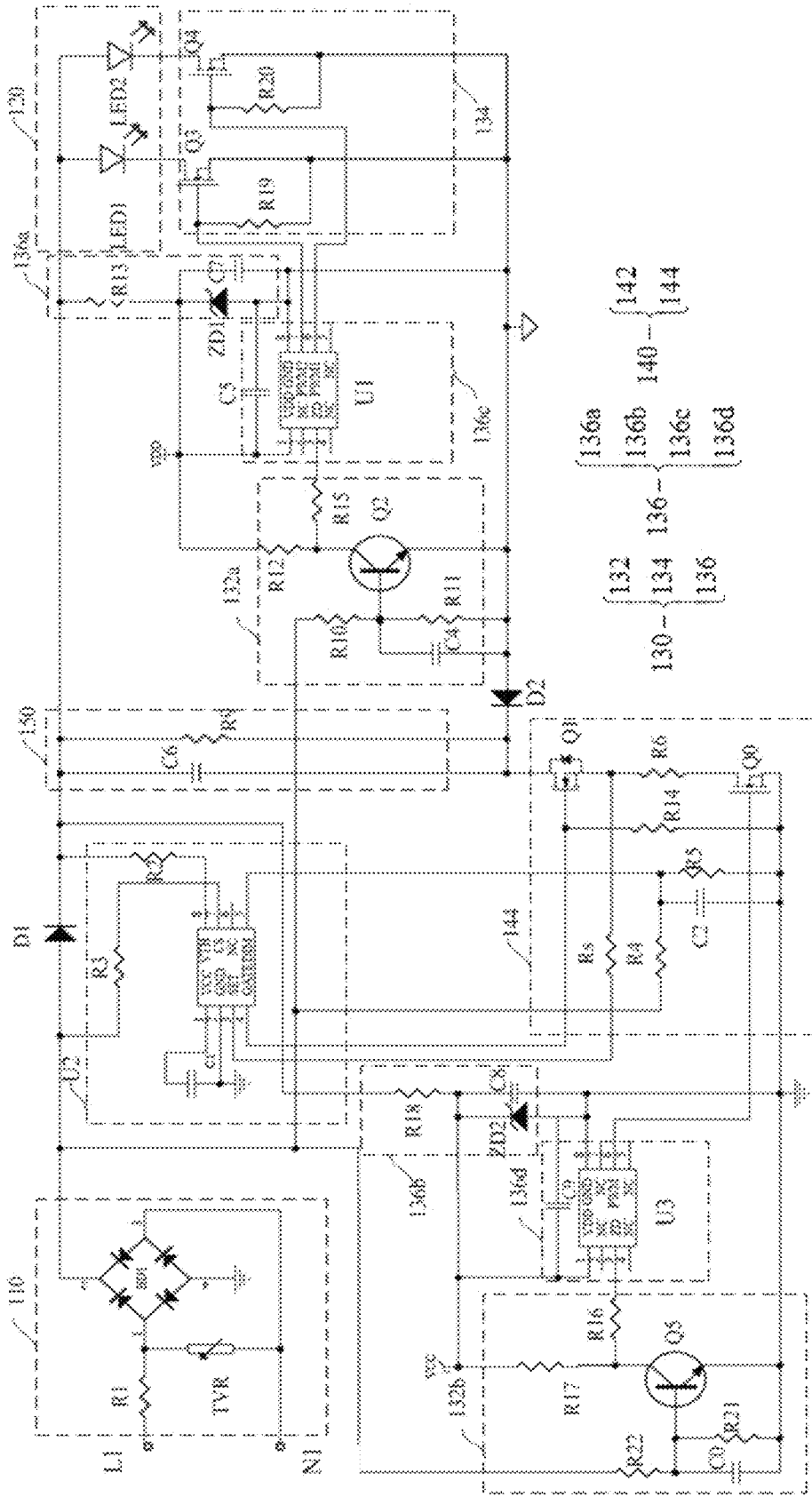
FIG. 8 is a circuit diagram of the linear drive circuit according to some embodiments of the present disclosure.

As shown in FIG. 8, this embodiment is based on Embodiment 2, and the AC-DC module 110, the LED module 120, the anti-flash module 150, the drive control chip U1, the drive control chip U2, the signal detection unit 132, and the switch control unit 134, the first power supply regulator subunit 136a, the second power supply regulator subunit 136b, and the CCT control subunit 136c in this embodiment are all the same as those in the Embodiment 7.

The brightness control subunit 136d is configured to send a brightness control signal to the linear current drive unit 144. The linear current drive unit 144 includes a first switch tube Q1 and a second switch tube Q0, where a gate of the first switch tube Q1 is electrically connected to the drive control chip U2 and is grounded through a ground resistor. A source of the first switch tube Q1 is connected to a drain of the second switch tube Q0 through a current limiting resistor R6. The source of the first switch tube Q1 is further electrically connected to the drive control chip U2 through a reducing resistor Rs. A drain of the first switch tube is electrically connected to the negative electrode of the second unidirectional conductive element D2. A gate of the second switch tube Q0 is electrically connected to the drive control chip U3 in the brightness control subunit 136d. A source of the second switch tube Q0 is grounded.

Compared to the linear drive circuit in Embodiment 7, when the linear driving circuit in this embodiment is working, the brightness control subunit 136d sends the brightness control signal to the linear current drive unit 144 in the second control unit 142; and then the linear current drive unit 144 adjusts the current in the loop corresponding to the LED module 120 through the second switch tube Q0 to adjust the brightness of the LED module 120.

During the adjustment of the brightness of the linear current drive unit 144, the first switch tube Q1 is on, the drive control chip U3 sends the brightness control signal to the second switch tube Q0 to control a conduction state of the second switch tube Q0, so as to adjust the magnitude of the conduction current corresponding to the first switching tube Q1, so as to adjust the magnitude of the loop corresponding to the LED module 120, so that the brightness is adjusted.

Embodiment 9

Figure 9:
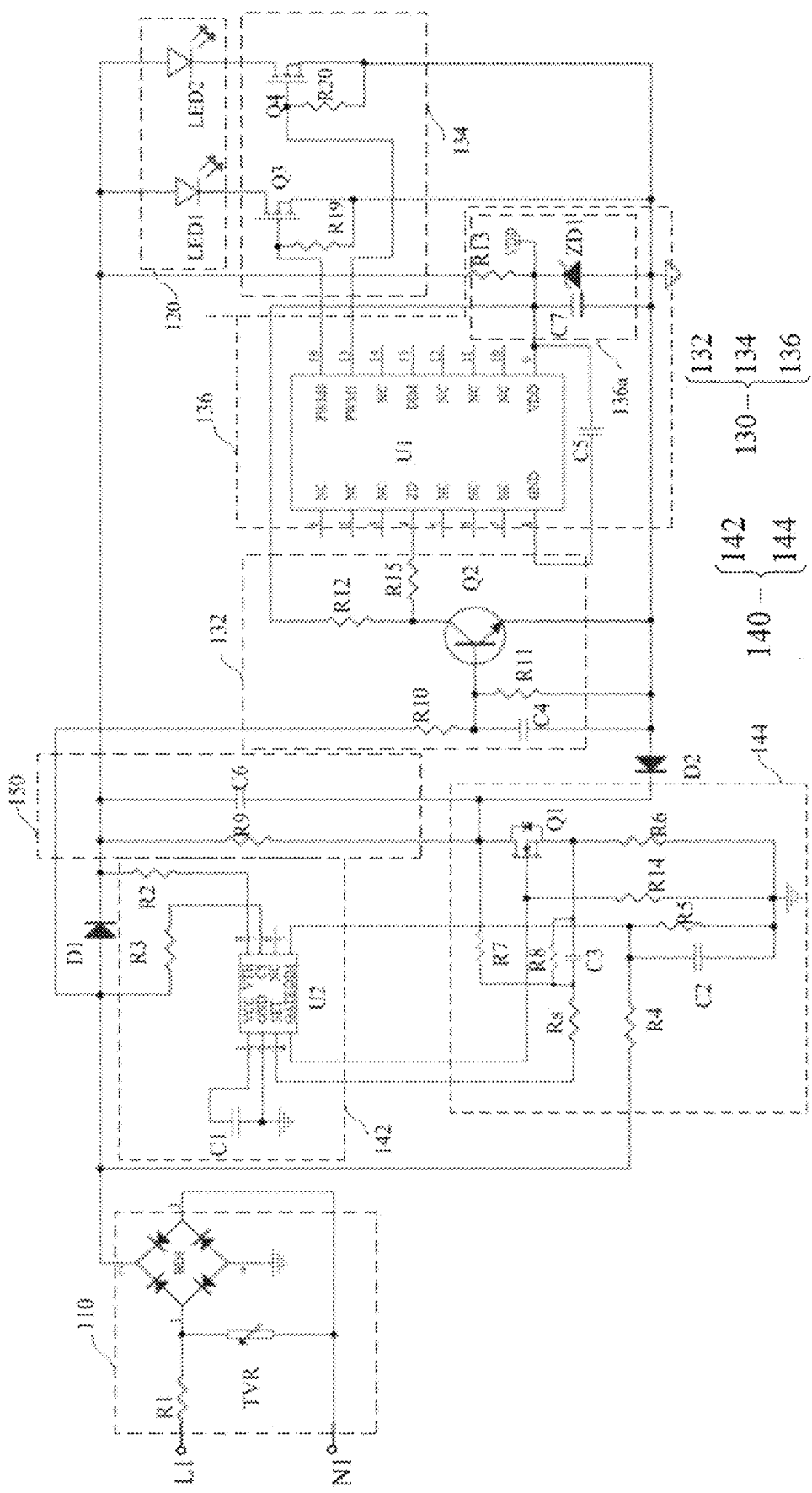
FIG. 9 is a circuit diagram of the linear drive circuit according to some embodiments of the present disclosure.

As shown in FIG. 9, in this embodiment, the CCT control signal includes at least two PWM control signals, and the CCT and brightness control module 130 includes:

a signal detection unit 132, which is electrically connected to the AC-DC module 110, and is configured to detect the DC voltage control signal and generate a corresponding control voltage detection signal;

a switch control unit 134, which is electrically connected to the LED module 120, a first control unit 136, and the drive control module, respectively; and the first control unit 136, which is electrically connected to the signal detection unit 132 and the switch control unit 134, and is configured to receive the control voltage detection signal sent from the signal detection unit 132, generate a corresponding CCT control signal according to the control voltage detection signal, and send each PWM control signal to the switch control unit 134 to adjust the current of each LED string, so as to adjust the CCT of the LED module 120 to a preset CCT.

The first control unit 136 is further configured to adjust a duty cycle of the CCT control signal, so that the switch control unit 134 outputs a corresponding brightness control signal, and sends it to the drive control module 140 through the second unidirectional conductive element D2.

The first control unit 136 includes a power supply regulator subunit 136a and a drive control chip U1. The signal detection unit 132 is electrically connected to the power supply regulator subunit 136a and the drive control chip U1. The power supply regulator subunit 136a is further electrically connected to the drive control chip U1 and a negative electrode of the first unidirectional conductive element D1, respectively.

The power supply regulator subunit 136a includes a capacitor C7, a voltage stabilizing diode ZD1 and a resistor R13, and is configured to provide a stable power supply VDD for the drive control chip U1.

The drive control module 140 includes a second control unit 142 and a linear current drive unit 144 that are electrically connected, where the second control unit 142 is further electrically connected to the AC-DC module 110, and the linear current drive unit 144 is further electrically connected to the switch control unit 134 respectively through the second unidirectional conductive element D2.

The second control unit 142 is configured to control the linear current drive unit 144, so that the linear current drive unit 144 is driven to turn on the LED module 120.

The linear current drive unit 144 is further configured to control the current of the loop corresponding to the LED module 120 according to the brightness control signal, so as to adjust the brightness of the LED module 120.

In this embodiment, the drive control chip U1 in the first control unit 136 can directly adjust a duty cycle of the CCT control signal, so that the switch control unit 134 outputs the corresponding brightness control signal and sends it to the drain of the switch tube Q1 in the drive control module 140 through the second unidirectional conductive element D2, to adjust the drain voltage of the switch tube Q1, thereby adjusting the current of the loop corresponding to the LED module 120 to adjust the brightness.

The AC-DC module 110, the LED module 120, the anti-flash module 150, the signal detection unit 132, the second control unit 142, the linear current drive unit 144, the drive control chip U1, and the drive control chip U2 in this embodiment are all the same as those in the Embodiment 5 shown in FIG. 5, so they will not be repeated herein.

In addition, the present disclosure further provides an LED light, where the LED light is provided with the linear drive circuit.

It should be understood that the above embodiments are just illustrative, and the devices and methods disclosed herein may also be implemented in other ways. For example, the flowcharts and structural diagrams in the accompanying drawings show possible implementations of the system architecture, functions and operations according to the devices, methods and computer program products in these embodiments of the present disclosure. Each block in the flowchart or block diagram may represent a module, a program segment, or a part of the codes; and the module, the program segment, or the part of the codes contains one or more functions for implementing executable instructions with the specified logical function. It should be noted that the functions marked in a block may be implemented in an order different from the order marked in the drawings. For example, two consecutive blocks can actually be executed at the same time, or in a reverse order, where the order of the blocks to be executed depends on the functions involved. Moreover, each block in the schematic diagram and/or flowchart, and the combination of the blocks in the schematic diagram and/or flowchart, may be realized by a dedicated hardware-based system that performs specified functions or actions, or by a combination of dedicated hardware and computer instructions.

In addition, all the functional modules or units in the various embodiments of the present disclosure may be integrated together to form an independent part, or each module may form an independent part, or two or more modules may be integrated to form an independent part.

If the function is implemented in the form of a software function module and sold or used as an independent product, it can be stored in a computer-readable storage medium. Therefore, the technical solution of the present disclosure or the part that contributes to the existing technology or the part of the technical solution can be embodied in the form of a software product. Such computer software product is stored in a storage medium, including several instructions which are used to drive a computer device (which may be a smart phone, a personal computer, a server, or a network device, etc.) execute all or part of the steps of the methods described in the various embodiments of the present disclosure. The aforementioned storage medium may be a USB disk, a mobile hard disk, a read-only memory (ROM), a random access memory (RAM), a magnetic disk, an optical disk or other medium that can store program codes.

Described above are only preferred embodiments of the present disclosure. It should be understood that the above-mentioned embodiments are exemplary, but not intended to limit the scope of the present disclosure. Any change, modification, replacement and variation made by those skilled in the art without departing from the principle and spirit of the present disclosure shall fall within the scope as defined in the appended claims.

What is claimed is:

1. A linear drive circuit for an LED light, comprising:
an AC-DC module configured to obtain an AC input voltage control signal, and convert the AC input voltage control signal into a DC voltage control signal;
an LED module comprising at least two LED strings with different correlated color temperatures (CCTs), and electrically connected to the AC-DC module through a first unidirectional conductive element;
a CCT and brightness control module electrically connected to the LED module, and configured to obtain a CCT control signal or a brightness control signal according to the DC voltage control signal, and adjust a CCT of each of the at least two LED strings in the LED module according to the CCT control signal; and
a drive control module electrically connected to the AC-DC module, and to the CCT and brightness control module through a second unidirectional conductive element, and configured to receive the brightness control signal from the CCT and brightness control module, and adjust brightness of the LED module according to the brightness control signal;
wherein the CCT control signal comprises at least two PWM control signals, and the CCT and brightness control module comprises:
a signal detection unit; and
a switch control unit;
wherein the signal detection unit is electrically connected to the AC-DC module and is configured to detect the DC voltage control signal and generate a control voltage detection signal;
the switch control unit is electrically connected to the LED module, a first control unit and the drive control module, respectively;
the first control unit is electrically connected to the signal detection unit and the switch control unit respectively, and is configured to receive the control voltage detection signal sent from the signal detection unit, generate the CCT control signal according to the control voltage detection signal, and send each of the at least two PWM control signals to the switch control unit to adjust a current of each of the at least two LED strings, so that a CCT of the LED module is adjusted to a preset CCT; and
the first control unit is further configured to generate the brightness control signal according to the control voltage detection signal, and send the brightness control signal to the drive control module.

2. The linear drive circuit of claim 1, wherein the drive control module comprises a second control unit and a linear current drive unit that are electrically connected, wherein the second control unit is further electrically connected to the AC-DC module, and the linear current drive unit is further electrically connected to the switch control unit through the second unidirectional conductive element;
the second control unit is configured to receive the brightness control signal sent from the first control unit, generate a reference voltage and a control signal according to the brightness control signal, and output the reference voltage and the control signal to the linear current drive unit; and
the linear current drive unit is configured to adjust and control an output current in a loop corresponding to the LED module according to the reference voltage and the control signal, so as to adjust the brightness of the LED module.

3. The linear drive circuit of claim 2, wherein the second control unit comprises an optocoupler isolating subunit, a reference voltage control subunit, and a drive control chip that are electrically connected in sequence; the switch control unit comprises at least two switch tubes connected in parallel; a first end of each of the at least two switch tubes is electrically connected to the first control unit; a second end of each of the at least two switch tubes is electrically connected to a corresponding LED string of the at least two LED strings; and a third end of each of the at least two switch tubes is electrically connected to the linear current drive unit through the second unidirectional conductive element;
the second control unit further comprises a power supply regulator subunit; a primary input terminal of the optocoupler isolating subunit is electrically connected to the first control unit; a primary output terminal of the optocoupler isolating subunit is connected to a virtual ground;
a secondary input terminal of the optocoupler isolating subunit is electrically connected to the AC-DC module through a pull-up resistor, or is electrically connected to the power supply regulator subunit; the power supply regulator subunit is electrically connected to the AC-DC module through a reducing resistor; a secondary output terminal of the optocoupler isolating subunit is electrically connected to the reference voltage control subunit;
the optocoupler isolating subunit is configured to receive and electrically isolate the brightness control signal, and send the brightness control signal which has been electrically isolated to the reference voltage control subunit;
the reference voltage control subunit is configured to generate a reference input voltage signal according to the brightness control signal which has been electrically isolated, and send the brightness control signal to the drive control chip; and
the drive control chip is configured to generate the reference voltage and the control signal according to the reference input voltage signal, and send the reference voltage and the control signal to the linear current drive unit.

4. The linear drive circuit of claim 2, wherein the second control unit comprises a drive control chip, which is electrically connected to the first control unit; the switch control unit comprises at least two switch branches connected in parallel, and each of the at least two switch branches comprises an optocoupler isolating subunit and a switch tube connected in series;
a primary input terminal of the optocoupler isolating subunit is connected to the first control unit through a current limiting resistor; a primary output terminal of the optocoupler isolating subunit is grounded; a secondary output terminal of the optocoupler isolating subunit is electrically connected to a first end of the switch tube; a second end of the switch tube is connected to a corresponding LED string of the at least two LED strings; and a third end of the switch tube is electrically connected to the linear current drive unit through the second unidirectional conductive element; and
the drive control chip is configured to directly receive the brightness control signal sent from the first control unit, generate the reference voltage and the control signal according to the brightness control signal, and send the reference voltage and the control signal to the linear current drive unit.

5. The linear drive circuit of claim 2, wherein the second control unit comprises a power supply regulator subunit, a drive control chip and an optocoupler isolating subunit; the drive control chip and the optocoupler isolating subunit are respectively electrically connected to the linear current drive unit; and the linear current drive unit comprises a first switch tube and a second switch tube;
  a primary input terminal of the optocoupler isolating subunit is electrically connected to the first control unit through a first current limiting resistor; a secondary output terminal of the optocoupler isolating subunit is connected to a first end of the second switch tube, and is grounded through a first ground resistor; a secondary input terminal of the optocoupler isolating subunit is electrically connected to the power supply regulator subunit through the second current limiting resistor; the power supply regulator subunit is further electrically connected to the AC-DC module through a first reducing resistor; and a second end of the second switch tube is grounded; and
  a first end of the first switch tube is electrically connected to the drive control chip and is grounded through a second ground resistor, and a second end of the first switch tube is connected to the second switch tube through a third current limiting resistor; the second end of the first switch tube is further electrically connected to the drive control chip through a second reducing resistor and a third reducing resistor connected in series; and a third end of the first switch tube is electrically connected to a negative electrode of the second unidirectional conductive element.

6. The linear drive circuit of claim 1, wherein the signal detection unit comprises a first signal detection subunit and a second signal detection subunit; the first control unit comprises a first power supply regulator subunit, a second power supply regulator subunit, a CCT control subunit, and a brightness control subunit;
  the first signal detection subunit is electrically connected to the AC-DC module and the CCT control subunit, respectively; and the second signal detection subunit is electrically connected to the AC-DC module and the brightness control subunit, respectively;
  the first power supply regulator subunit is electrically connected to a negative electrode of the first unidirectional conductive element and the CCT control subunit, respectively; and the second power supply regulator subunit is electrically connected to the negative electrode of the first unidirectional conductive element and the brightness control subunit, respectively;
  the first signal detection subunit is configured to detect the DC voltage control signal; generate a CCT voltage detection signal; and send the CCT voltage detection signal to the CCT control subunit;
  the CCT control subunit is configured to generate a CCT control signal according to the CCT voltage detection signal, and send each PWM control signal to the switch control unit to adjust a current of each LED string, so that the CCT of the LED module is adjusted to the preset CCT;
  the second signal detection subunit is configured to detect the DC voltage control signal, generate a brightness voltage detection signal, generate a brightness control signal according to the brightness voltage detection signal, and send the brightness voltage detection signal to the brightness control subunit; and
  the brightness control subunit is configured to generate a brightness control signal according to the brightness voltage detection signal, and send the brightness voltage detection signal to the drive control module.

7. The linear drive circuit of claim 6, wherein the brightness control subunit is configured to send the brightness control signal to the second control unit; the second control unit comprises a drive control chip and a reference voltage adjustment subunit electrically connected; the linear current drive unit comprises a switch tube; a first end of the switch tube is electrically connected to the drive control chip and is grounded through a ground resistor; a second end of the switch tube is connected to the drive control chip through a first resistor and a second resistor connected in series; the first resistor are connected in parallel with a filter capacitor; and a third end of the switch tube is electrically connected to a negative electrode of the second unidirectional conductive element;
  the reference voltage adjustment subunit is configured to receive the brightness control signal sent from the brightness control subunit, generate the reference voltage adjustment signal according to the brightness control signal, and send it to the drive control chip;
  the drive control chip is configured to generate the reference voltage and the control signal according to the brightness control signal, and send the reference voltage and the control signal to the linear current drive unit.

8. The linear drive circuit of claim 6, wherein the brightness control subunit is configured to send the brightness control signal to the linear current drive unit; the linear current drive unit comprises a first switch tube and a second switch tube; a first end of the first switch tube is electrically connected to the drive control chip and is grounded through a ground resistor, and a second end of the first switch tube is connected to a first end of the second switch tube through a current limiting resistor; the second end of the first switch tube is further electrically connected to the drive control chip through a reducing resistor; a third end of the first switch tube is electrically connected to a negative electrode of the second unidirectional conductive element; and a second end of the second switch tube is electrically connected to the brightness control subunit; and a third end of the second switch tube is grounded.

9. The linear drive circuit of claim 6, wherein the first signal detection subunit and the second signal detection subunit have the same structure; the first signal detection subunit comprises a first voltage divider resistor, a second voltage divider resistor, a switch tube, a reducing resistor, and a current limiting resistor; the first voltage divider resistor and the filter capacitor are connected in parallel; a first terminal of the first voltage divider resistor and the filter capacitor connected in parallel, and a first end of the switch tube are both connected to a positive electrode of the second unidirectional conductive element; a second terminal of the first voltage divider resistor and the filter capacitor connected in parallel is respectively electrically connected to a second end of the switch tube and one end of the second voltage divider resistor; the other end of the second voltage divider resistor is electrically connected to the AC-DC module; a third end of the switch tube is electrically connected to the first power supply regulator unit through the reducing resistor, and is electrically connected to the CCT control subunit through the current limiting resistor.

10. The linear drive circuit of claim 1, wherein the signal detection unit comprises a first voltage divider resistor, a second voltage divider resistor, a switch tube, a reducing resistor, a filter capacitor, and a current limiting resistor;

the first voltage divider resistor and the filter capacitor are connected in parallel; a first terminal of the first voltage divider resistor and the filter capacitor connected in parallel, and a first end of the switch tube are both connected to a positive electrode of the second unidirectional conductive element; a second terminal of the first voltage divider resistor and the filter capacitor connected in parallel is electrically connected to a second end of the switch tube and one end of the second voltage divider resistor, respectively; the other end of the second voltage divider resistor is electrically connected to the AC-DC module; and a third end of the switch tube is electrically connected to the first control unit through the current limiting resistor.

11. An LED light comprising the linear drive circuit of claim 1.

12. A linear drive circuit for an LED light, comprising:
an AC-DC module configured to obtain an AC input voltage control signal, and convert the AC input voltage control signal into a DC voltage control signal;
an LED module comprising at least two LED strings with different CCTs, and electrically connected to the AC-DC module through a first unidirectional conductive element;
a CCT and brightness control module electrically connected to the LED module, and configured to obtain a CCT control signal or a brightness control signal according to the DC voltage control signal, and adjust a CCT of each of the at least two LED strings in the LED module according to the CCT control signal; and
a drive control module electrically connected to the AC-DC module, and to the CCT and brightness control module through a second unidirectional conductive element, and configured to receive the brightness control signal from the CCT and brightness control module, and adjust brightness of the LED module according to the brightness control signal;
wherein the CCT control signal comprises at least two PWM control signals, and the CCT and brightness control module comprises:
a signal detection unit; and
a switch control unit;

wherein the signal detection unit is electrically connected to the AC-DC module and is configured to detect the DC voltage control signal and generate a control voltage detection signal; the switch control unit is electrically connected to the LED module, a first control unit, and the drive control module, respectively;

the first control unit is respectively electrically connected to the signal detection unit and the switch control unit, and is configured to receive the control voltage detection signal sent from the signal detection unit, generate a CCT control signal according to the control voltage detection signal, and send each of the at least two PWM control signals to the switch control unit to adjust a current of each of the at least two LED strings, so that a CCT of the LED module is adjusted to a preset CCT; and the first control unit is further configured to adjust a duty cycle of the CCT control signal, so that the switch control unit outputs a brightness control signal, and sends the brightness control signal to the drive control module through the second unidirectional conductive element.

13. The linear drive circuit of claim 12, wherein the first control unit comprises a power supply regulator subunit and a drive control chip; the signal detection unit is electrically connected to the power supply regulator subunit and the drive control chip, respectively; and the power supply regulator subunit is electrically connected to the drive control chip and a negative electrode of the first unidirectional conductive element, respectively.

14. The linear drive circuit of claim 13, wherein the drive control module comprises a second control unit and a linear current drive unit electrically connected; the second control unit is further electrically connected to the AC-DC module; and the linear current drive unit are further electrically connected with the switch control unit through the second unidirectional conductive element;

the second control unit is configured to control the linear current drive unit, so that the linear current drive unit drives the LED module to turn on the LED module;

the linear current drive unit is further configured to adjust and control a current of a loop corresponding to the LED module according to the brightness control signal, so as to adjust brightness of the LED module.

15. An LED light comprising the linear drive circuit of claim 12.

* * * * *